United States Patent [19]
Miyagawa et al.

[11] Patent Number: 5,335,781
[45] Date of Patent: Aug. 9, 1994

[54] COMPACT DRIVE UNIT FOR AN OVERHEAD CONVEYOR SYSTEM

[75] Inventors: Kozo Miyagawa, Hendersonville; Gregory A. Clark, Gallatin, both of Tenn.

[73] Assignee: Tsubaki Conveyor of America, Inc., Portland, Tenn.

[21] Appl. No.: 949,023

[22] Filed: Sep. 22, 1992

[51] Int. Cl.⁵ ............................................. B65G 23/06
[52] U.S. Cl. .................................................. 198/834
[58] Field of Search ............... 198/834, 835; 474/155, 474/156, 157

[56] References Cited

U.S. PATENT DOCUMENTS

| | | | |
|---|---|---|---|
| 3,595,380 | 7/1971 | Miller | 198/834 |
| 3,871,513 | 3/1975 | Georg et al. | 198/834 X |
| 3,985,225 | 10/1976 | Baun et al. | 198/834 |
| 4,179,024 | 12/1979 | Boersma | 198/834 X |

FOREIGN PATENT DOCUMENTS 3545300  6/1987  Fed. Rep. of Germany ...... 198/834

Primary Examiner—Cheryl L. Gastineau
Attorney, Agent, or Firm—Longacre & White

[57] ABSTRACT

The instant invention provides a compact sprocket type drive unit which can be manufactured from reduced number of parts. The invention further provides a method by which multiple drive units for a single conveyor or synchronization between separate conveyors can be achieved without the necessity of costly electrical and mechanical control devices. Because the present invention provides automatically synchronized multiple conveyors, the transfer of work from one conveyor to another can be achieved with vast savings in cost of conveyor design, manufacturing, and installation.

13 Claims, 6 Drawing Sheets

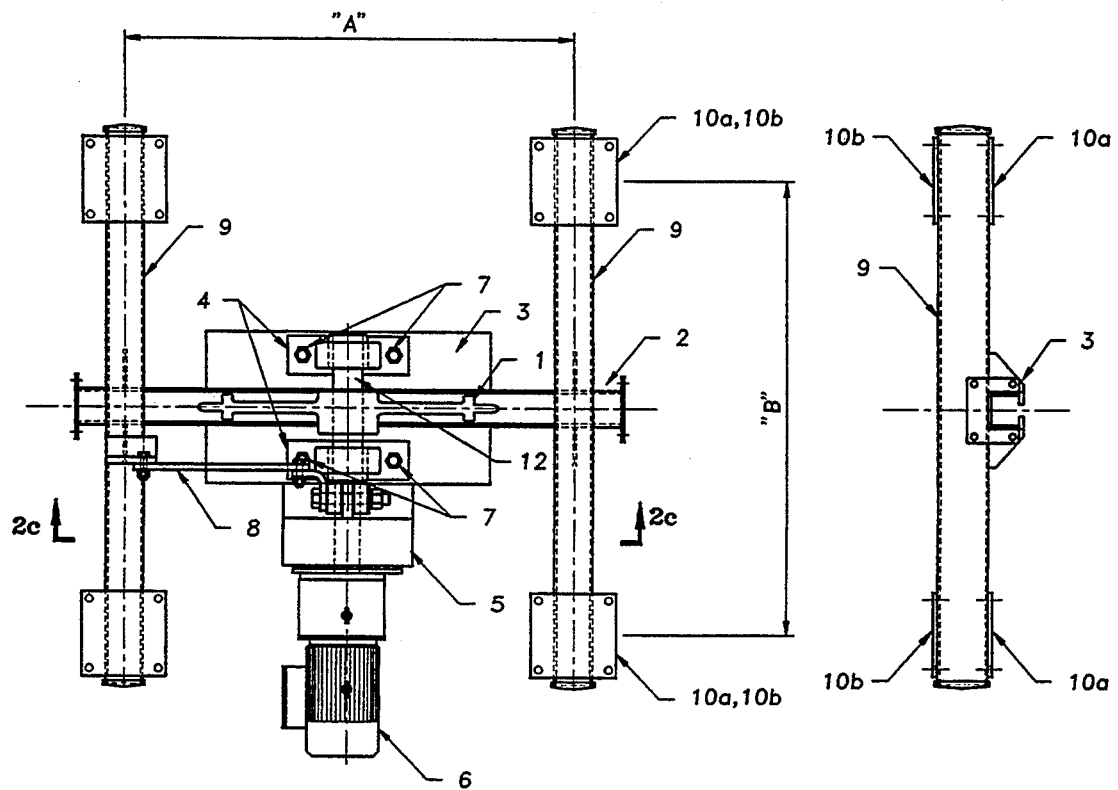
FIGURE 2a
FIGURE 2b
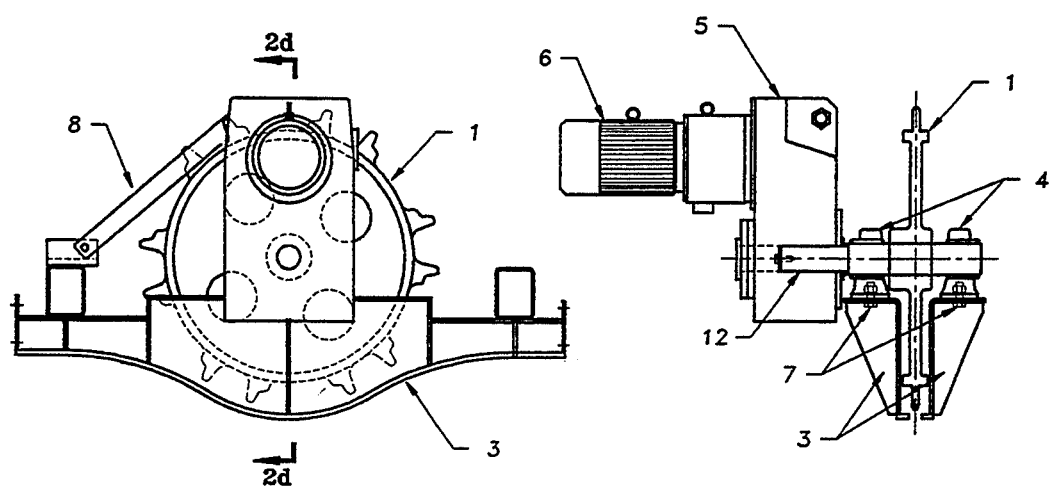
FIGURE 2c
FIGURE 2d

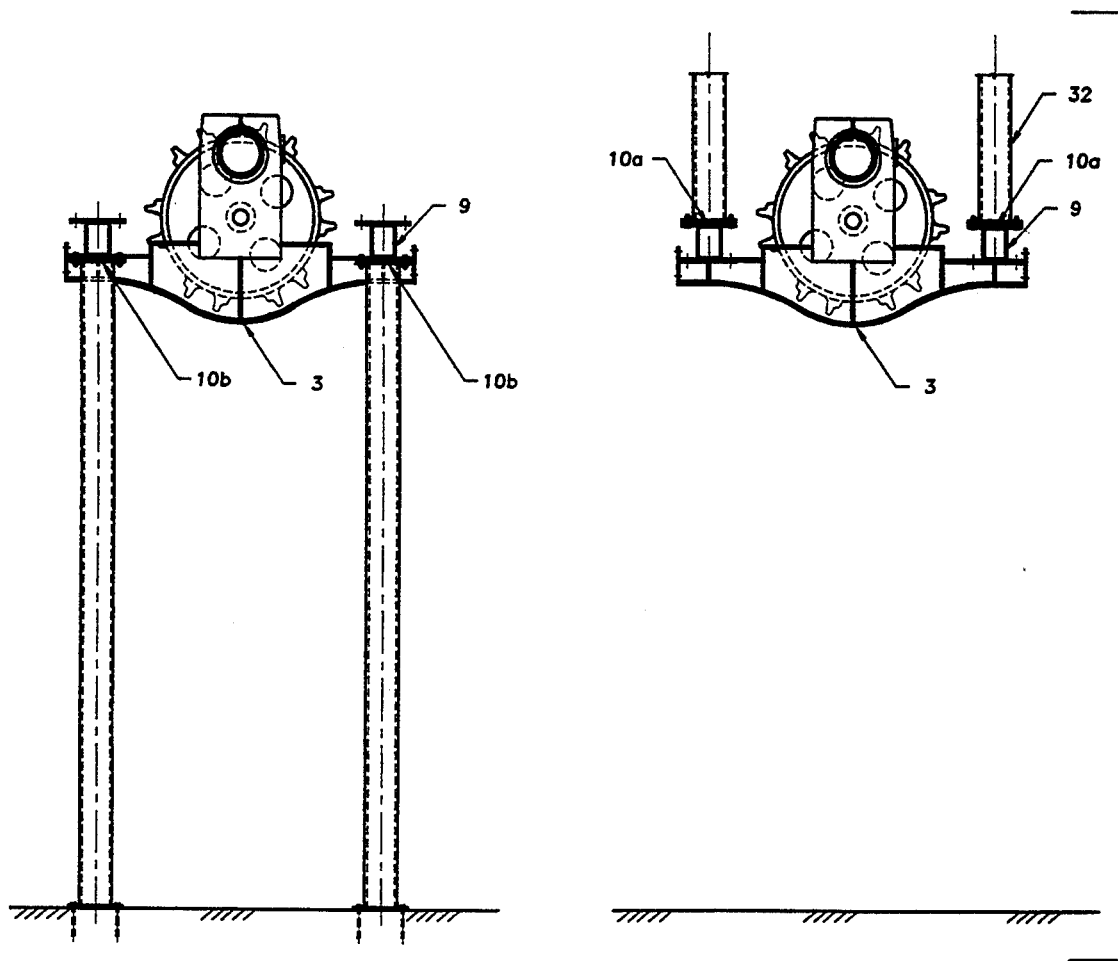
FIGURE 3a
FIGURE 3b
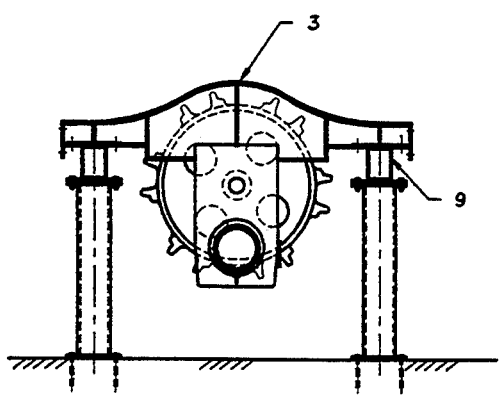
FIGURE 3c

COMPACT DRIVE UNIT FOR AN OVERHEAD CONVEYOR SYSTEM

BACKGROUND OF THE INVENTION

Field of Invention

The invention is a compact drive unit for conveyor systems which through its design is flexible in its orientation to the conveyor, and offers many versatile mechanical opportunities which may be implemented at a greatly reduced cost over current methods.

Description of Related Art

Chain type conveyor systems, whether overhead or floor type systems, are typically driven by two basic methods, a sprocket drive method or a drive chain method.

The sprocket drive method, shown in prior art FIG. 1a, uses a main drive sprocket 1, which engages a conveyor chain 2. Through the rotation of the main drive sprocket, the conveyor chain 2 is moved in the direction of the illustrated arrows.

The drive chain method, on the other hand, uses a master chain 2a, which is driven by a plurality of sprockets, shown by way of example as sprockets 1a and 1b. The sprocket driven master chain 2a engages the conveyor chain 2 and through its rotation moves the conveyor chain 2 in the direction of the illustrated arrows, as shown in prior art FIG. 1b.

Currently, both the sprocket and drive chain methods are costly from a manufacturing stand point. This cost is due to the necessity of the many mechanical components required in the transfer of power from an electrical motor through a mechanical reduction mechanism and ultimately to the drive mechanism. The many associated mechanical components often require highly precise alignment and adjustment in order to provide proper service from the drive unit and have a direct relationship, not only with the drive unit performance but also with the drive units working life.

Often in larger conveyor systems, multiple drive units are required. In the condition of multiple drive units, there is the necessity to synchronize the drive units in order to provide satisfactory conveyor performance and to equally distribute the work requirement between the multiple drive units. Large conveyor systems normally require elaborate electrical systems through which the multiple drive units must be linked, as well as additional mechanical devices in order to constantly monitor each of the multiple drive units to insure proper performance. These systems normally result in higher product cost as well as increased maintenance cost to the end user of the conveyor system.

In industrial applications of conveyor systems, it is often necessary to synchronize one conveyor system with another conveyor system in order to provide a constant flow of work from one process area to another without waiting or interruption. For these systems, the drive units of the separate conveyor systems must be linked much like the drive units of the multiple drive system. Again, this leads to higher product cost and increased maintenance.

These higher initial product costs and increased maintenance procedures may often prevent the introduction of modern material handling methods into many manufacturing facilities; the end result being the choice between a lower cost and lesser quality material handling system, from a performance stand point, or no material handling system at all.

SUMMARY OF THE INVENTION

The instant invention provides a method by which a compact sprocket type drive unit can be manufactured from a reduced number of parts. The simplified arrangement of the instant invention does not require a high degree of technical ability during assembly, will perform satisfactorily, and will offer increased working life and reduced maintenance cost.

This invention further provides a method by which multiple drive units for a single conveyor or synchronization between separate conveyors can be achieved without the necessity of costly electrical and mechanical control devices.

It is the object of this invention to greatly reduce the cost of a highly sophisticated material handling system. Due to the fact that the current methods of synchronization are no longer necessary, the present invention lowers manufacturing costs, as well as installation costs, and implements a compact drive unit system.

It is further the object of this invention to make high technology material handling systems available to a much wider range of manufacturers, and to allow an overall increase in the manufacturing methods and technologies in many areas to which this technology is not currently available. This will be accomplished due to the reduced product costs coupled with reduced maintenance costs to the end user of the material handling system.

Further objects, advantages and features of this invention will appear in the following disclosure and description including the accompanying drawings.

BRIEF DESCRIPTION OF THE DRAWINGS

FIG. 2A shows the plan view of improved compact drive unit of the instant invention.

FIG. 2B shows the side view of improved compact drive unit of the instant invention.

FIG. 2C shows the sectional view of improved compact drive unit of the instant invention taken along lines 2C—2C of FIG. 2A.

FIG. 2D shows the sectional view of improved compact drive unit of the instant invention taken along lines 2D—2D of FIG. 2C.

FIG. 3A shows an embodiment of the improved compact drive unit illustrated in FIG. 2C, wherein the drive unit is supported from below.

FIG. 3B shows an embodiment of the improved compact drive unit illustrated in FIG. 2C, wherein the drive unit is suspended from above.

FIG. 3C shows an embodiment of the improved compact drive unit illustrated in FIG. 2C, wherein the drive unit is inverted.

DETAILED DESCRIPTION OF INVENTION

The following description will reference FIGS. 2a, 2b, 2c, and 2d which show the various views of the compact drive unit of the present invention and indicate the basic structural arrangement.

Figure 1A:
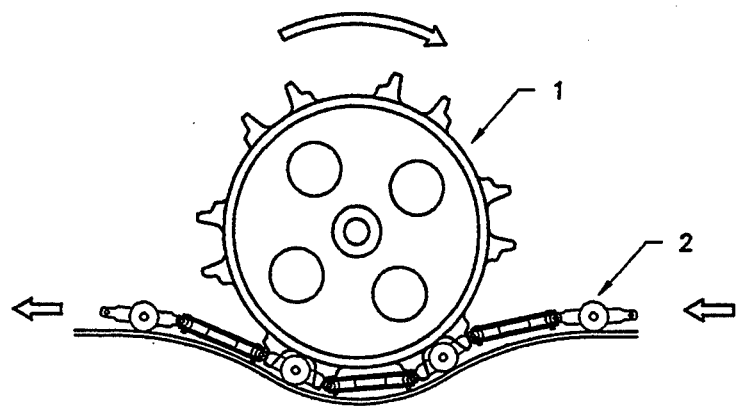
FIG. 1A shows the prior art sprocket drive method of driving a conveyor chain.
Figure 1B:
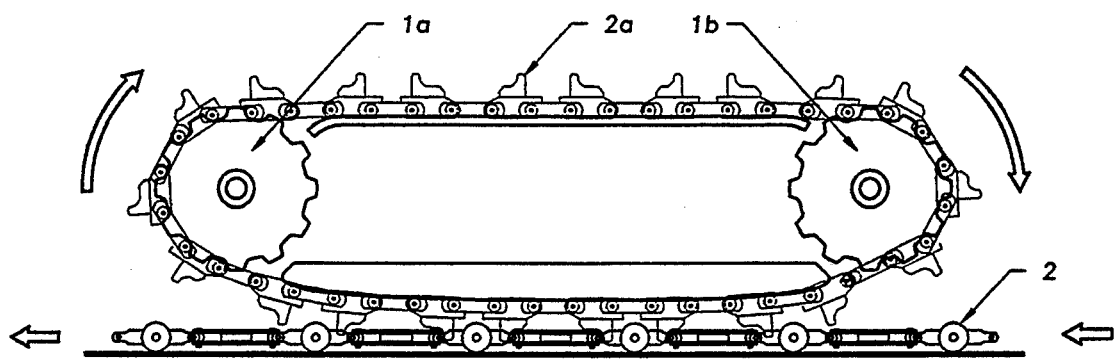
FIG. 1B shows the prior art drive chain method of driving a conveyor chain.

The main sprocket 1 is mounted on the main drive shaft 12 and is driven by the same. The main drive shaft 12 is mounted on the compact drive unit frame 3 by means of two standard pillow block type bearings 4. Operatively engaging the main sprocket 1 is a conveyor chain 2 which is driven by the main sprocket 1 in the manner shown in prior art FIG. 1a and described above.

The mechanical reduction device 5 and corresponding electrical motor 6 are also mounted on the main drive shaft 12 so as to drive the shaft at a desired speed. In general, mechanical reducers and electrical motors are interchangeable depending on the compact drive units required specifications. There are many manufactures of these items and the configuration of the motor and reducer varies among manufactures. The gear ratio, output torque requirements and motor horsepower rating must be designed to satisfy the specific application of the compact drive unit and are determined as per standard engineering practice.

The diameter of the main drive shaft 12 is determined by the overhung load of the reducer 5 and motor 6 based upon the weight of the selected motor and reducer and as per standard engineering practice.

The diameter of the main shaft 12 is the determining factor in the selection of pillow blocks 4. Holes are drilled in the horizontal surfaces of the compact drive unit frame 3 through which bolts 7 are inserted. The pillow blocks 4 are permanently and securely mounted to the compact drive unit frame by means of the bolts 7.

A torsion arm 8 is connected to the compact drive unit frame 3 and to the reducer 5. The torsion arm 8 stabilizes the reducer during the operation of the compact drive unit and is particularly important at the start up of the compact drive unit when the torque requirements are the greatest.

The configuration of the torsion arm 8, its physical dimensions, and the means by which it is connected to the compact drive unit frame 3 and the reducer 5 are to be determined by the physical properties of the reducer selected and as per standard engineering practice.

The compact drive unit frame 3 is configured in such a way that the conveyor chain 2 can pass through smoothly and in such a way that main drive sprocket 1 engages the conveyor chain 2 smoothly and securely.

As shown in FIGS. 2A and 2B, across the top of the compact drive unit frame 3 are two horizontal suspension members 9 which are attached by welding.

On the upper and lower surfaces of the horizontal suspension members 9 are bolt plates 10a and 10b, respectively, which are attached by welding. As shown in FIG. 2A, bolt plates 10a and 10b are located at dimension "A" and "B" in relation to the compact drive unit frame 3. For ease in the manufacturing and installation process of the compact drive unit of the present invention, it is recommended that dimension "A" be equal to dimension "B".

The bolt plates 10b on the lower surface of horizontal suspension members 9 are for connection to a support device, for example support device 30, in the case that the compact drive unit is supported from below as shown in FIG. 3a.

The bolt plates 10a on the upper surfaces of the horizontal suspension members 9 are for connection to a support device, for example support device 32, in the case that the compact drive unit is suspended from above as shown in FIG. 3b.

A unique feature of the compact drive unit is that the entire drive unit can be inverted for use as a floor type conveyor as shown in FIG. 3c. This feature enables the compact drive unit to be used for a wide variety of applications.

In the case that a conveyor system requires multiple drive units in order to satisfy the designs specifications, the compact drive unit can be modified easily in order to meet these requirements.

Figure 4:
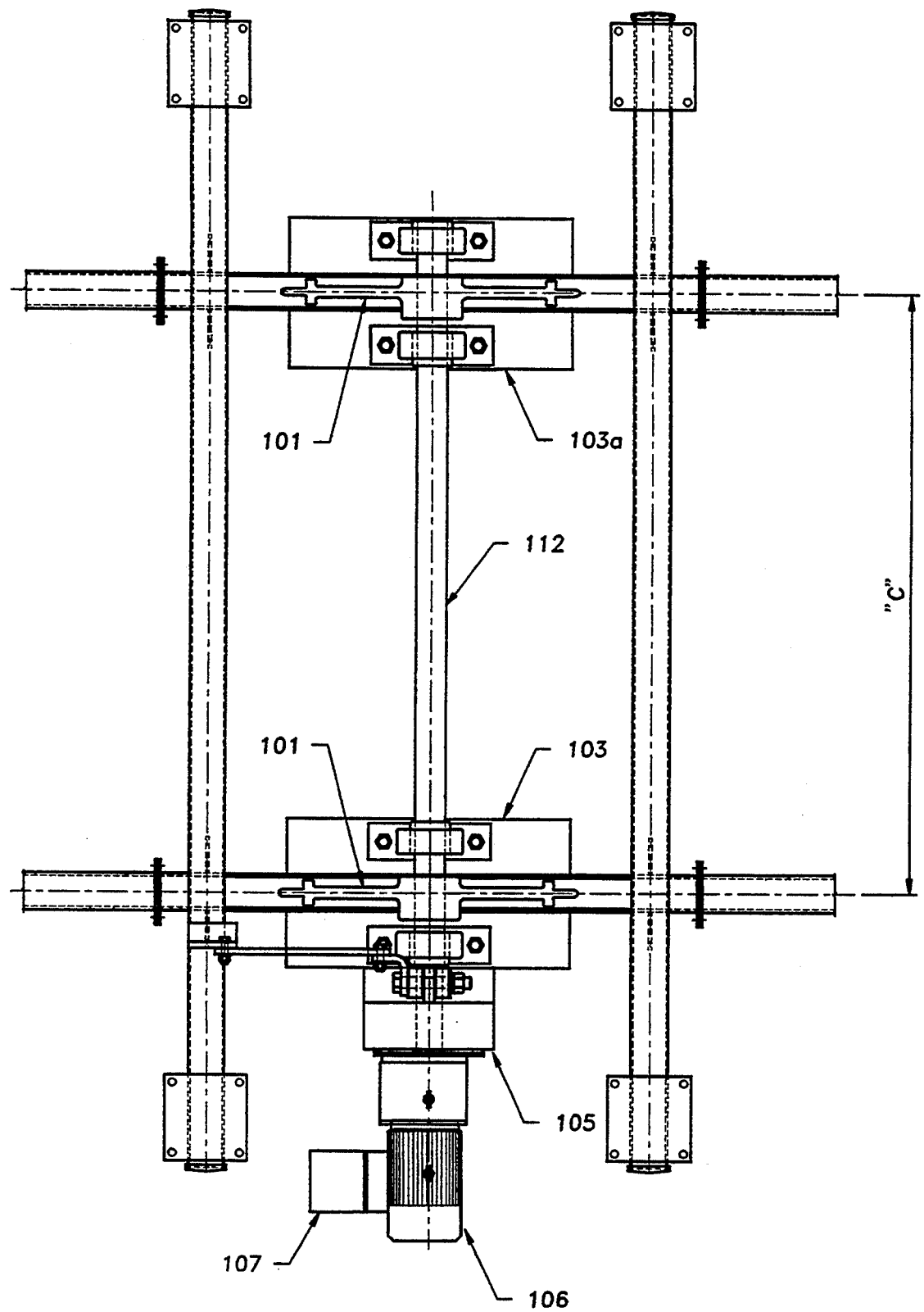
FIG. 4 shows a modification of the improved compact drive unit for use in the synchronization of multiple drive units or for use as a single drive for synchronous conveyors.

In FIG. 4, a plan view is shown of a modified "compact drive unit which satisfies the requirements for a multiple drive. For this system, a single motor is provided to drive a number of conveyors.

For this embodiment, the main drive shaft 112 of the master compact drive unit 103 is extended to the slave compact drive unit 103a. The motor 106 and reducer 105 are mounted on the master compact drive unit 103. The reduction ratio and output torque requirements of reducer 105 and the horsepower rating of motor 106 are to be determined as per standard engineering practice in consideration of the fact that both the master compact drive unit 103 and the slave compact drive unit 103a share a common power source.

The distinct advantage to the separate compact drive units 103 and 103a is that the main drive sprockets 101, which are mounted on common shaft 112 and driven by a common power source 105 and 106, are automatically synchronized. Thus, there is no need for electrical or mechanical control devices to insure synchronization being that the compact drive units are not operated independently.

The speed of conveyor travel automatically decides the reduction ratio of reducer 105. In the event that the drive unit specifications require variable speed capabilities, this can be accomplished through an inverter control mechanism 107 for the motor 106.

The arrangement, as illustrated by FIG. 4, satisfies the requirement of multiple drive units for a single conveyor line. The arrangement also satisfies the requirement of two separate synchronous conveyors being that the slave compact drive unit 103a can be arranged as the primary drive unit for one of the two conveyor lines in a synchronous conveyor arrangement while the master compact drive unit 103 can be arranged as the primary drive unit for the other.

Dimension "C" the distance between the master compact drive unit 103 and the slave compact drive unit 103a, can be determined by the minimum dimension between two parallel lines in the conveyor system. This eases the design of the conveyor layout and simplifies the location of the drive units within a single multiple drive conveyor system.

Figure 7:
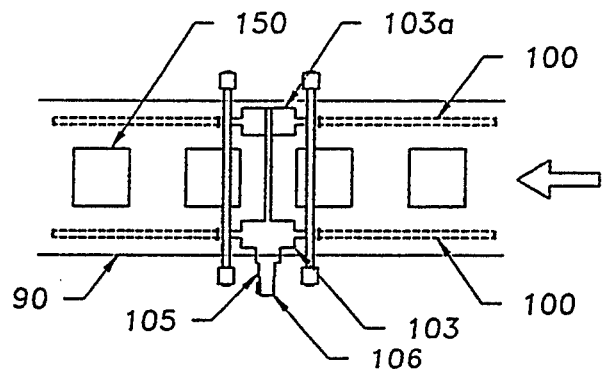
FIG. 7 shows a typical arrangement whereby multiple drive units are provided for a single conveyor line.

FIG. 7 illustrates a typical arrangement whereby multiple drive units are provided for a single conveyor line. For the system shown in FIG. 7, motor 106 and reducer 105 drive both the master compact drive unit 103 and the slave compact drive unit 103a. The rotation of these drive units 103 and 103a moves the conveyor chains 100. The rotation of the conveyor chains 100 drives the conveyor 90 which, in turn, transports the articles 150 in the direction of the arrow.

In the case that the synchronized compact drive assembly in FIG. 4 is used in the condition of two separate synchronous conveyors, a segment of the conveyor 5 driven by the slave compact drive unit 103a must be routed to the drive unit location of the master compact drive 103. This presents no major design problems due to the fact that synchronous conveyors normally are located in the general proximity of each other.

As described previously, the speed of conveyor travel determines the reduction ratio of reducer 105. Thus, the two separate conveyor lines will automatically move at the same rate of travel.

Figure 5:
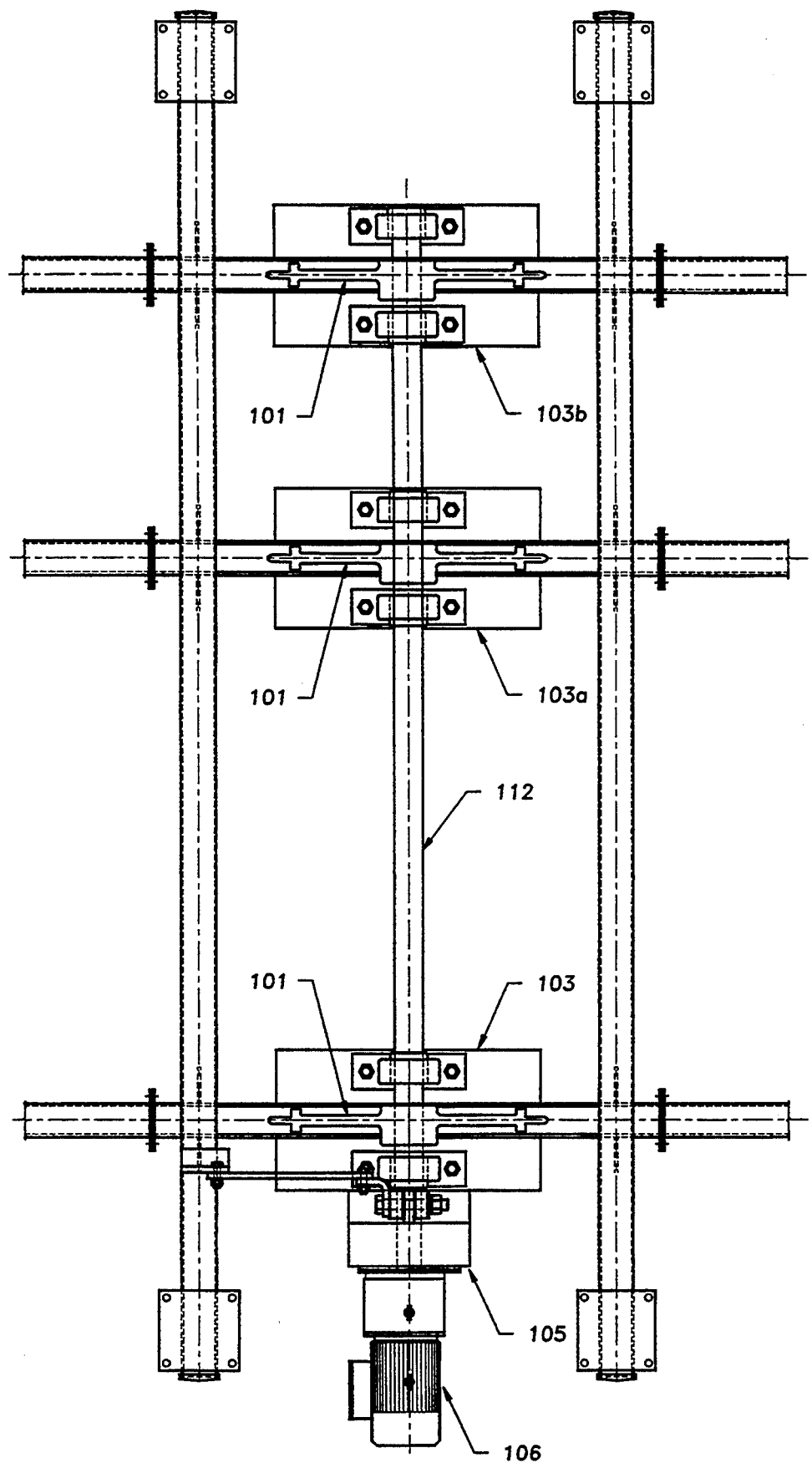
FIG. 5 shows a further modification of the improved compact drive unit to incorporate synchronized transfer capabilities.

A further advantage to the instant invention is through the modification of the synchronized compact drive assembly shown in FIG. 4, whereby synchronized transfer capabilities are achieved through the addition of a third synchronized compact drive unit 103b as shown in FIG. 5.

In FIG. 5, the plan view is shown of a synchronized transfer style compact drive unit 103b in conjunction with two synchronous compact drive units 103 and 103a.

As previously described, the synchronized transfer compact drive unit 103b (FIG. 5) shares the common shaft 112 with the slave compact drive unit 103a and the master compact drive unit 103. Again, due to the fact that the main drive sprockets 101 of the compact drive units 103, 103a, and 103b are driven by a common power source 105 and 106, synchronization among the three compact drives is automatic and is achieved without the necessity of electrical or mechanical control devices.

Figure 6:
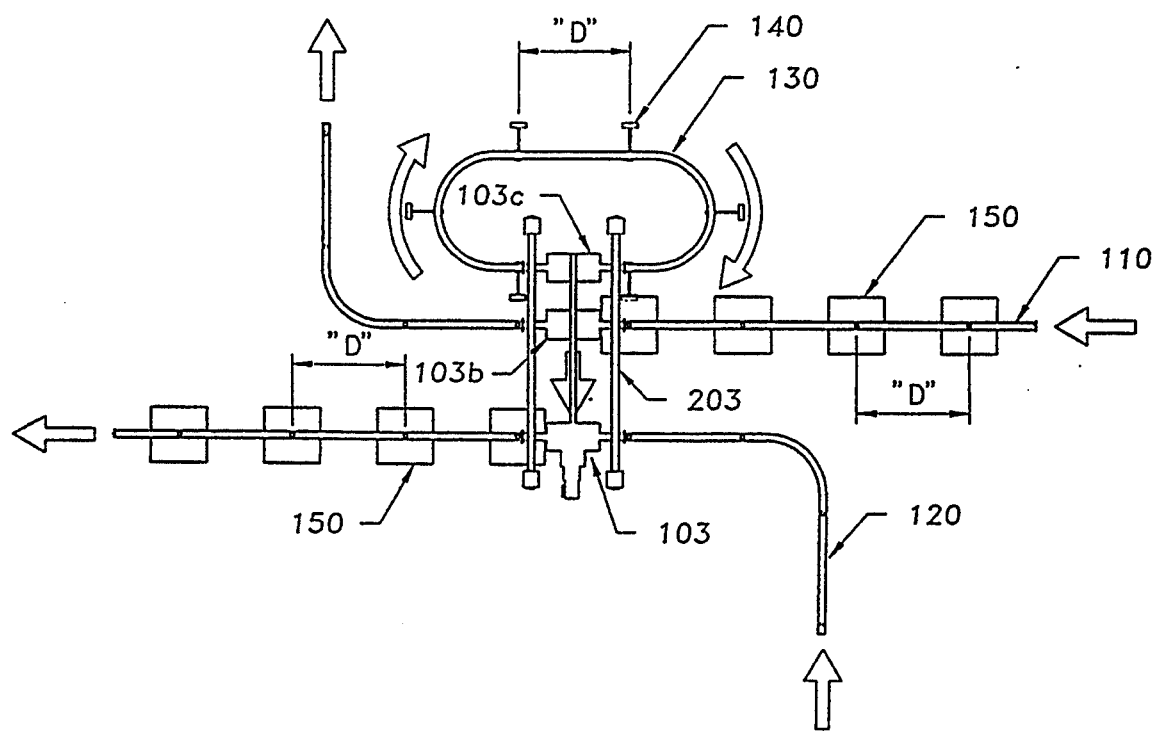
FIG. 6 shows an example of two synchronous conveyors and a synchronized transfer loop conveyor all driven by the modified improved compact drive unit illustrating the synchronized transfer capabilities.

FIG. 6 illustrates the arrangement of a transfer point between two synchronized conveyors 110 and 120 by means of a synchronized transfer loop conveyor 130. Conveyors 110, 120, and 130 are all synchronous and are all driven by the synchronized transfer compact drive unit assembly as shown in FIG. 5.

In FIG. 6, the dimension "D" represents the distance between the article being transported by the conveyors on synchronous transport conveyors 110 and 120. Dimension "D" also corresponds to the synchronized transfer loop conveyor 130 as the distance between transfer mechanisms, for example pushers 140.

The article being transported by the conveyors, shown generally as 150, is being transported along conveyor 110 in the direction indicated by arrow E. At the center line of the compact drive unit assembly, shown generally as 203, the article 150 is transferred to conveyor 120 by means of the transfer mechanism 140 belonging to the synchronized transfer loop conveyor 130.

After the point of transfer 203, conveyor 110 is empty of articles 150 and conveyor 120 is loaded with the articles 150.

The actual transfer mechanism 140, used by the synchronized loop conveyor 130, will vary according to the product being transported, however, through the synchronization of all three conveyors 110, 120, and 130 without the use of the electrical and mechanical control devises, a great deal of high cost items have been eliminated.

As described previously, the speed of conveyor travel determines the reduction ratio of reducer 105. Because the conveyor lines 110, 120 and 130 are each driven by the reducer 105, these conveyors will automatically move at the same rate of travel.

Due to the fact that the three conveyors 110, 120 and 130 are automatically synchronized, the transfer of work from one conveyor to another can be achieved with vast savings in cost of conveyor design, manufacturing, and installation. This arrangement eliminates altogether the design and controls of a sophisticated transfer machine which will vary from one product to another. Considering the cost of designing, manufacturing, and installing a transfer machine, a transfer mechanism can be designed at very little cost comparatively.

Aside from the greatly reduced cost of the synchronized transfer capability described in the discussion of FIGS. 5 and 6, it must also be recognized that the maintenance cost of this arrangement is reduced by approximately two thirds when compared to the known processes due to the fact that one drive unit operates all three components, rather than requiring one drive unit for each component.

The present invention not only reduces maintenance costs by the reduction in the number of parts which require regular maintenance, but also reduces and simplifies the maintenance procedures.

Due to the simplicity of the operation of the synchronized transfer compact drive unit arrangement of the instant invention, there is no need for highly skilled technicians to perform the maintenance.

Therefore, the instant invention provides a compact drive unit frame 3 (Ref FIGS. 2a, 2b, 2c, and 2d), a main drive sprocket 1 and a pillow block bearings 4 constituting a compact drive unit core. To this core of basic components is added the main shaft 2, the reducer 5, the motor 6, the torsion arm 8 and the horizontal suspension members 9 with bolt plates 10a and 10b to form the compact drive unit assembly. By variation of components 2, 5, 6, 8, 9, and 10, the compact drive unit assembly can be adapted to a wide variety of applications such as previously described.

While the present invention has been particularly shown and described with reference to the preferred embodiments, it will be understood by those having ordinary skill in the art that various changes in form and detail may be made therein without departing from the spirit and scope of the invention.

We claim:

1. A compact drive unit for a conveyor system comprising:

conveyor means for transporting articles between various locations, said conveyor means comprising a conveyor chain;

drive means for driving said conveyor system;

a main drive shaft for transmitting drive from said drive means to said conveyor means;

sprocket means, engaging said main drive shaft, for transmitting drive from said main drive shaft to said conveyor means;

a drive unit frame upon which is mounted said main drive shaft, said drive unit frame adapted to partially enclose said sprocket means;

bearing means, provided between said main drive shaft and said drive unit frame, for reducing the frictional resistance between said main drive shaft and said drive unit frame;

wherein said conveyor chain passes into said drive unit frame in a first direction, engages said sprocket means, and exits said drive unit frame in a second direction substantially equal to said first direction.

2. A compact drive unit for a conveyor system as recited in claim 1, wherein said drive means comprises a motor and a torque reducing means, provided between said motor and said main drive shaft, for altering the torque transmitted from said motor to said main drive shaft.

3. A compact drive unit for a conveyor system comprising:
- conveyor means for transporting articles between various locations, said conveyor means comprising a conveyor chain;
- drive means for driving said conveyor system, said drive means comprising a motor and a torque reducing means, provided between said motor and said main drive shaft, for altering the torque transmitted from said motor to said main drive shaft;
- a main drive shaft for transmitting drive from said drive means to said conveyor means;
- sprocket means, engaging said main drive shaft, for transmitting drive from said main drive shaft to said conveyor means;
- a drive unit frame upon which is mounted said main drive shaft, said drive unit frame adapted to partially enclose said sprocket means;
- bearing means, provided between said main drive shaft and said drive unit frame, for reducing the frictional resistance between said main drive shaft and said drive unit frame;
- a torsion absorbing means for absorbing torque and stabilizing the torque reducing means during operation of the compact drive unit;
- wherein said conveyor chain is adapted to pass through said drive unit frame and engage said sprocket means.

4. A compact drive unit for a conveyor system as recited in claim 3, wherein said torsion absorbing means is connected to said drive unit frame and said torque reducing means.

5. A compact drive unit for a conveyor system as recited in claim 1, further comprising suspension means for suspending said compact drive unit at a predetermined height, said suspension means adapted to be affixed to said drive unit frame.

6. A compact drive unit for a conveyor system as recited in claim 5, wherein said suspension means comprises a support means for supporting said suspension means, suspension members affixed to said drive unit frame and attachment means for attaching said suspension members to said support means.

7. A compact drive unit for a conveyor system as recited in claim 6, wherein said attachment means is adapted to support said compact drive unit from below.

8. A compact drive unit for a conveyor system as recited in claim 6, wherein said attachment means is adapted to suspend said compact drive unit from above.

9. A compact drive unit for a conveyor system as recited in claim 5, wherein said suspension means is adapted to suspend said compact drive unit in an inverted manner.

10. The compact drive unit for a conveyor system as recited in claim 1, further comprising:
- at least one additional conveyor means for transporting articles between various locations, each of said at least one additional conveyor means comprising a conveyor chain;
- at least one additional sprocket means, engaging said main drive shaft, for transmitting drive from said main drive shaft to each of said at least one additional conveyor means;
- secondary drive unit frames upon which is mounted said main drive shaft, said secondary drive unit frames adapted to partially enclose said additional sprocket means;
- bearing means, provided between said main drive shaft and each of said secondary drive unit frames, for reducing the frictional resistance between said main drive shaft and said secondary drive unit frames,
- wherein said sprocket means and said additional sprocket means are driven by said drive means.

11. The compact drive unit for a conveyor system as recited in claim 10, further comprising suspension means for suspending said compact drive unit at a predetermined height, said suspension means adapted to be affixed to both said drive unit frame and said additional drive unit frames.

12. The compact drive unit for a conveyor system as recited in claim 11, wherein said suspension means comprises a support means for supporting said suspension means, a plurality of suspension members affixed to said drive unit frame and said additional drive unit frames, and attachment means for attaching said suspension members to said support means.

13. The compact drive unit for a conveyor system as recited in claim 11, wherein said suspension means is adapted to suspend said compact drive unit in an inverted manner.

* * * * *